(12) United States Patent
Schmitz et al.

(10) Patent No.: US 11,734,653 B2
(45) Date of Patent: Aug. 22, 2023

(54) SYSTEMS AND METHODS FOR AUTOMOBILE MAINTENANCE SCHEDULING

(71) Applicant: My Car Fix, LLC, Paradise Valley, AZ (US)

(72) Inventors: Mark Schmitz, Paradise Valley, AZ (US); Mychal Merrill, Tempe, AZ (US)

(73) Assignee: My Car Fix, LLC, Paradise Valley, AZ (US)

( * ) Notice: Subject to any disclaimer, the term of this patent is extended or adjusted under 35 U.S.C. 154(b) by 0 days.

(21) Appl. No.: 17/482,338

(22) Filed: Sep. 22, 2021

(65) Prior Publication Data
US 2022/0012694 A1 Jan. 13, 2022

Related U.S. Application Data

(63) Continuation-in-part of application No. 15/648,224, filed on Jul. 12, 2017, now abandoned.

(60) Provisional application No. 62/361,392, filed on Jul. 12, 2016.

(51) Int. Cl.
*G06Q 30/00* (2023.01)
*G06Q 10/20* (2023.01)
*G06Q 30/08* (2012.01)
*G06Q 10/087* (2023.01)
*G06Q 30/0204* (2023.01)
(Continued)

(52) U.S. Cl.
CPC .......... *G06Q 10/20* (2013.01); *G06Q 10/087* (2013.01); *G06Q 30/0201* (2013.01); *G06Q 30/0205* (2013.01); *G06Q 30/0283* (2013.01); *G06Q 30/08* (2013.01)

(58) Field of Classification Search
CPC .............. G06Q 10/20; G06Q 30/0201; G06Q 30/0205; G06Q 30/0283; G06Q 30/08
USPC ........................................................ 705/26.3
See application file for complete search history.

(56) References Cited

U.S. PATENT DOCUMENTS

| 9,799,010 B1 * | 10/2017 | Leise ..................... G01B 21/00 |
| 10,614,414 B1 * | 4/2020 | Raymond .......... G06Q 10/0633 |
| 2004/0249532 A1 | 12/2004 | Kelly et al. |

(Continued)

OTHER PUBLICATIONS

Haase, M. (Oct. 26, 2007). Customers book service online afford dealer; express handles oil changes, small repairs: [final edition]. Edmonton Journal Retrieved from https://www.proquest.com/newspapers/customers-book-service-online-at-ford-dealer/docview/253479595/se-2 (Year: 2007).*

(Continued)

*Primary Examiner* — Arielle E Weiner
(74) *Attorney, Agent, or Firm* — Snell & Wilmer L.L.P

(57) ABSTRACT

An automobile maintenance application may link automobile owners with service providers and provide service reminders based on manufacturers' recommended scheduled maintenance. The automobile maintenance application may maintain maintenance records for automobiles. The automobile maintenance application may provide a system for service providers to send targeted advertisements to automobile owners in need of a service. The maintenance application may allow automobile owners to compare the prices and services of local service providers and benefit from the value associated with competition between service providers that is realized during a live or proxy auction.

19 Claims, 11 Drawing Sheets

(51) Int. Cl.
   *G06Q 30/0201* (2023.01)
   *G06Q 30/0283* (2023.01)

(56) References Cited

U.S. PATENT DOCUMENTS

| | | | |
|---|---|---|---|
| 2006/0136325 | A1 | 6/2006 | Barry et al. |
| 2008/0040129 | A1* | 2/2008 | Cauwels ............... G06Q 10/20 |
| | | | 705/305 |
| 2011/0010276 | A1* | 1/2011 | Bowser ............. G06Q 10/0875 |
| | | | 705/29 |
| 2013/0338873 | A1* | 12/2013 | Baalu .................... G06Q 30/08 |
| | | | 701/31.4 |
| 2014/0095339 | A1* | 4/2014 | Cooke ............... G06Q 30/0611 |
| | | | 705/26.4 |
| 2015/0100504 | A1 | 4/2015 | Binion et al. |
| 2017/0032400 | A1* | 2/2017 | Gilmore ............ G06Q 30/0206 |
| 2019/0333026 | A1* | 10/2019 | Roberts, III ...... G06F 16/90335 |

OTHER PUBLICATIONS

USPTO, Non Final Office Action dated May 21, 2019 with U.S. Appl. No. 15/648,224.
USPTO, Final Office Action Sep. 11, 2019 with U.S. Appl. No. 15/648,224.
USPTO, Advisory Action Dec. 23, 2019 with U.S. Appl. No. 15/648,224.
USPTO, Non Final Office Action dated May 5, 2020 with U.S. Appl. No. 15/648,224.
USPTO, Final Office Action Feb. 23, 2021 with U.S. Appl. No. 15/648,224.
USPTO, Advisory Action Sep. 3, 2021 with U.S. Appl. No. 15/648,224.

* cited by examiner

SYSTEMS AND METHODS FOR AUTOMOBILE MAINTENANCE SCHEDULING

CROSS-REFERENCE TO RELATED APPLICATIONS

This application is a continuation-in-part of, and claims priority to, and the benefit of U.S. Non-Provisional application Ser. No. 15/648,224 titled "SYSTEMS AND METHODS FOR AUTOMOBILE MAINTENANCE SCHEDULING," and filed on Jul. 12, 2017, which claims priority to, and the benefit of U.S. Provisional Application No. 62/361,392 titled "SYSTEMS AND METHODS FOR AUTOMOBILE MAINTENANCE SCHEDULING," and filed on Jul. 12, 2016, both of which are incorporated by reference herein in their entirety.

FIELD

The present disclosure generally relates to automobile maintenance, and more particularly to systems and methods for maintaining automobile maintenance records and scheduling maintenance services.

BACKGROUND

Manufacturers of modern automobiles typically provide a recommended maintenance schedule. However, automobile owners often misplace, ignore, or otherwise do not follow the recommended maintenance schedule. It may be overly cumbersome for an automobile owner to maintain records of which services have already been performed, or what locations are available to service the automobile for a reasonable price. Additionally, it may be difficult for automobile service centers to effectively target advertisements to automobile owners who are in need of service to their automobile.

SUMMARY

A method for facilitating maintenance of an automobile is disclosed herein. The method may comprise: submitting, by a computer-based system and through a graphical user interface (GUI), a service order for a plurality of maintenance services for the automobile, the service order including a service price and a first limit bid for each service in the plurality of maintenance services; submitting, by the computer-based system and through the graphical user interface (GUI), a replacement part order for a plurality of replacement parts for the automobile, the replacement part order including a replacement part price and a second limit bid for each replacement part in the plurality of replacement parts; receiving a notification that a user has selected at least one of a selected service from the plurality of maintenance services and scheduled the selected service, the user selecting the selected service based on receiving a list of service providers including a service offer for the selected service based on the service order submitted for the selected service; and servicing the automobile with the selected service.

In various embodiments, servicing the automobile includes removing a first part from the automobile and installing a second part in the automobile, the second part being one of the plurality of replacement parts. Receiving the notification may further comprise the user selecting a set of services in the plurality of maintenance services. The method may further comprise receiving, by the computer-based system and through a display device, a market forecast for the plurality of maintenance services and the plurality of replacement parts. The method may further comprise receiving, by the computer-based system and through the display device, a market data for the plurality of maintenance services and the plurality of replacement parts. The service order and the replacement part order may be based on one of the market forecast and the market data. The market forecast may be based on compiling a plurality of users in the computer-based system, each user in the plurality of users corresponding to an estimated service date based on a recommended maintenance schedule associated with a specific car for each user in the plurality of users.

A method is disclosed herein. The method may comprise: receiving a demand forecast for a plurality of replacement parts for a plurality of automobiles, the demand forecast based on a plurality of estimated maintenance services, the plurality of estimated maintenance services determined from a vehicle type, a recommended maintenance schedule associated with the vehicle type, and a mileage per unit time input for each user in a plurality of users; determining a quantity of each replacement part in the plurality of replacement parts to stock in an inventory based on the demand forecast; and stocking the inventory with the quantity of each part in the plurality of replacement parts.

In various embodiments, the method may further comprise servicing an automobile with a selected part in the plurality of replacement parts, the selected part being selected from the inventory. The plurality of users may be compiled via a computer based system, and receiving the demand forecast for the plurality of replacement parts may be through the computer based system. The plurality of users for generating the demand forecast may be in a specific geographical region. The demand forecast may be generated in response to a critical mass of users being reached in the specific geographical region. The method may further comprise submitting a replacement part order for the plurality of replacement parts for an automobile in the plurality of automobiles, the replacement part order including a replacement part starting offer and a limit bid for each replacement part in the plurality of replacement parts. The method may further comprise receiving a notification that a user has selected a selected service from a plurality of maintenance services and scheduled the selected service, the selected service including replacement of a selected replacement part in the plurality of replacement parts, the user selecting the selected service based on receiving a list of service providers including a service offer for the selected service based on the replacement part order submitted for the selected service.

A computer-based system is disclosed herein. The computer-based system may comprise: a display device for an automobile service provider; a processor in operable communication with the display device; and a tangible, non-transitory memory configured to communicate with the processor, the tangible, non-transitory memory having instructions stored thereon that, in response to execution by the processor, cause the processor to perform operations comprising: compiling a plurality of users, each user in the plurality of users associated with a registered vehicle, a recommended service schedule, an initial mileage, a mileage per unit time estimation, and a location; determining a critical mass of users has been reached for a geographical region based on a number of compiled users in the geographical region exceeding a threshold; calculating an estimated number of services to be performed for a plurality of services based on the registered vehicle, the recommended service schedule, the initial mileage, and the mileage per unit time estimation for each user in the plurality of users having the location be within the geographical region; and generating a market forecast based on the estimated number of services, the market forecast being displayable on the display device in response to the market forecast being generated.

In various embodiments, the display device is disposed at a service provider located in the geographical region. The operations may further comprise receiving, through a graphical user interface (GUI) on the display device, a service order for each service in the plurality of services. The operations may further comprise: compiling a first cost data for a plurality of parts in the geographical region; and compiling a second cost data for the plurality of services in the geographical region. The first cost data and the second cost data may be compiled in response to services in the plurality of services being scheduled by the plurality of users through the computer-based system. The operations may further comprise determining market data for the plurality of parts based on the first cost data.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Systems and methods for an automobile maintenance application are disclosed. The automobile maintenance application may link automobile owners with service providers and provide service reminders based on manufacturers' recommended scheduled maintenance. The automobile maintenance application may maintain maintenance records for automobiles. The automobile maintenance application may provide a system for service providers to send targeted advertisements to automobile owners in need of a service. The maintenance application may allow automobile owners to compare the prices and services of local service providers.

Figure 1:
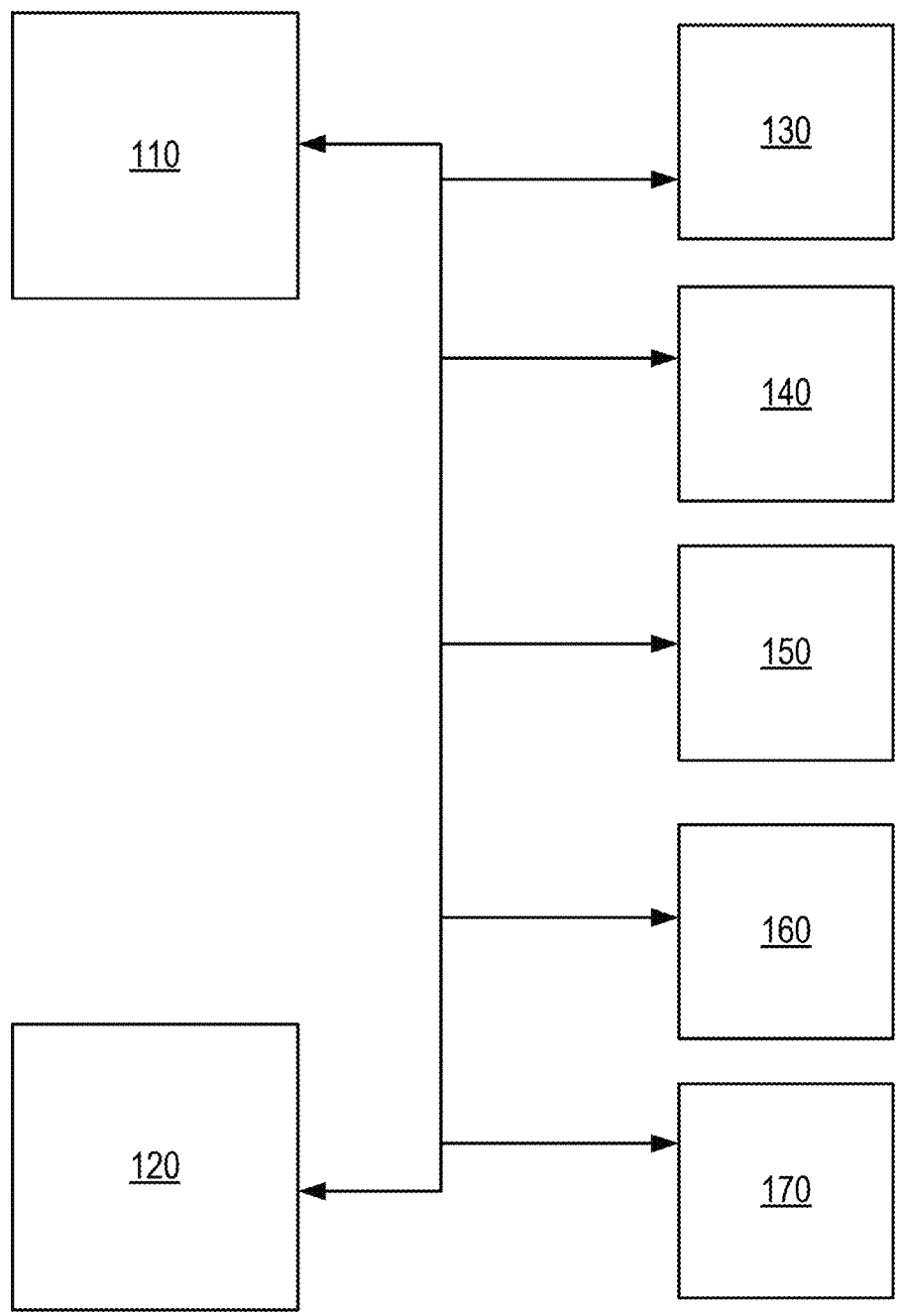
FIG. 1 illustrates a system for scheduling automobile maintenance according to various embodiments of the disclosure.

Referring to FIG. 1, a system 100 for scheduling automobile maintenance is illustrated according to various embodiments. The system may comprise a first web client 110. The web client 110 may be operated by an automobile owner. The system may comprise a second web client 120. The second web client 120 may be operated by a service provider. A web client may comprise any device capable of communicating over a network, such as a computer, smartphone, tablet, etc. The web clients 110, 120 may comprise a user interface which allows a user to interact with the web client 110.

The system 100 may comprise various databases. In various embodiments, the system 100 may comprise a car manufacturer database 130, a car service database 140, a car mileage database 150, a car location database 160, and a service bid database 170. The car manufacturer database 130 may store information related to all makes and models of vehicles, as well as manufacturers' recommended maintenance schedules. The car service database 140 may store information related to what services have been performed for individual vehicles. The car mileage database 150 and car location database 160 may track information in real time about vehicle location and current mileage estimates based on driving habits of automobile owners. The service bid database 170 may provide storage for manufacturers to bid on service needs. The service bid database 170 may be used for both blind bids as well as using real-time information. The various system components may communicate over a network.

Figure 2:
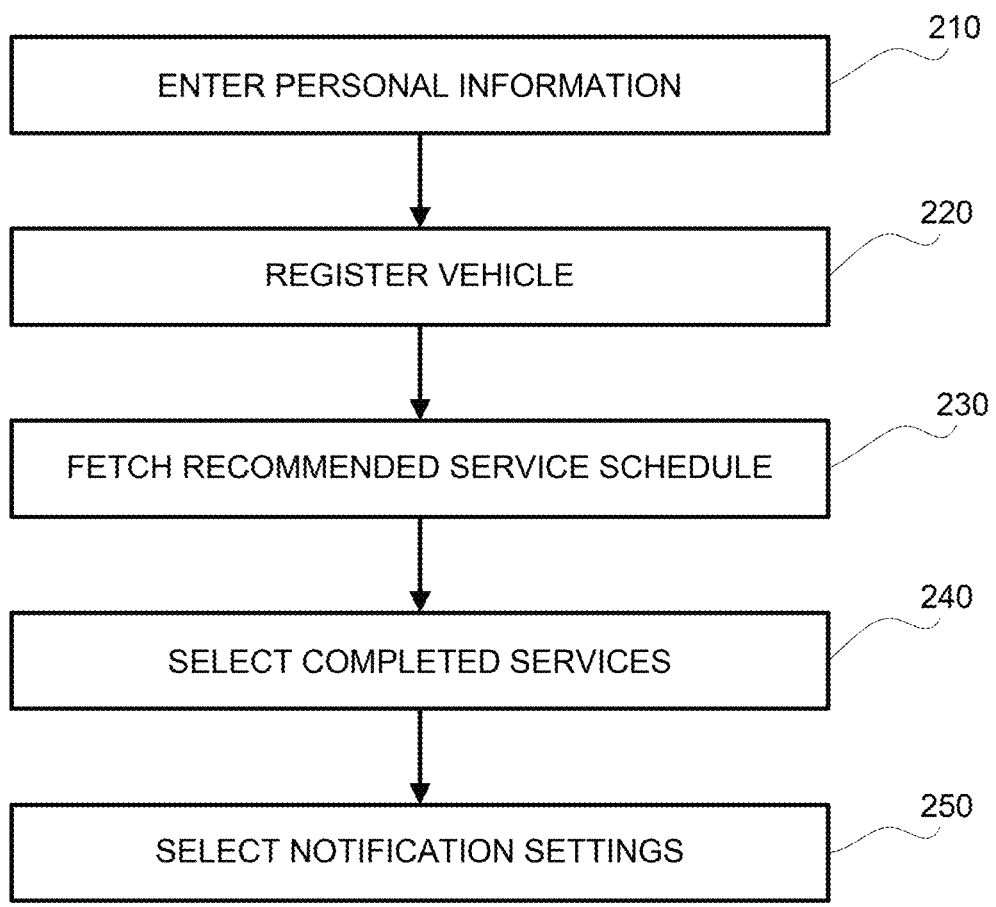
FIG. 2 illustrates a process for registering an automobile owner according to various embodiments.
Figure 3:
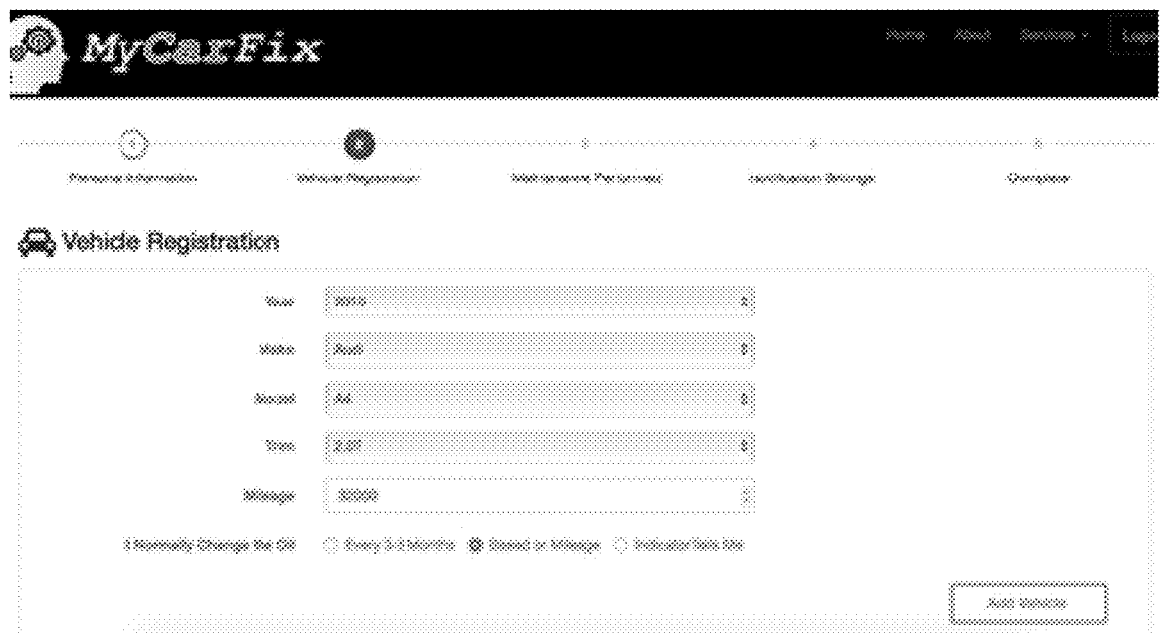
FIG. 3 illustrates an example screenshot of a registration page according to various embodiments.

Referring to FIG. 2, a flowchart of a process 200 for registering an automobile owner with the system is illustrated according to various embodiments. An automobile owner may access the maintenance application via the web client and enter registration information. FIG. 3 illustrates an example screenshot of a registration page. The automobile owner may enter personal information such as name, address, email address, phone number, etc. to set up an account (step 210). The automobile owner may register one or more vehicles associated with the account (step 220). Vehicle information may comprise year, make, model, trim, mileage, etc. The automobile owner may select whether they perform certain services, such as oil changes, based on mileage or time (e.g. every 3,000 miles or every 3 months). The entered information may be stored in the car manufacturer database, the car service database, and/or the car mileage database. The maintenance application may fetch a recommended service schedule (step 230). In various embodiments, the maintenance application may fetch the recommended service schedule from an automobile manufacturer using an API.

Figure 4:
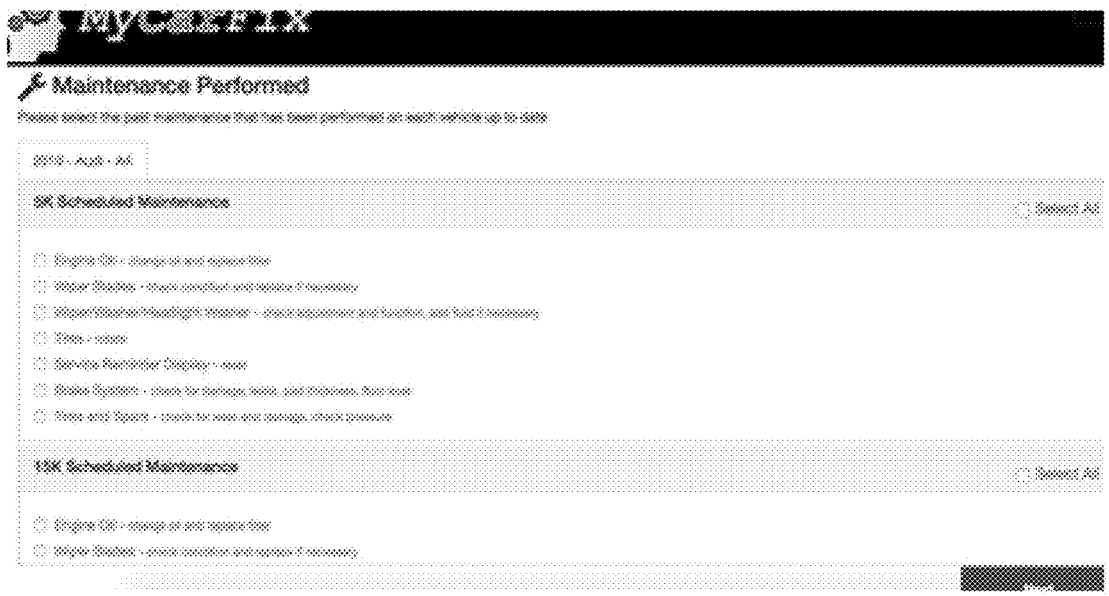
FIG. 4 illustrates an example screenshot of a maintenance page according to various embodiments.

The automobile owner may select services which have already been completed on a maintenance page (step 240). FIG. 4 illustrates an example of a screen shot of a maintenance page according to various embodiments The maintenance page may comprise the recommended service schedule for the automobile. For example, if an automobile has already had a 10,000 mile service completed, the automobile owner may mark the 10,000 mile service complete. In various embodiments, the automobile owner may have the opportunity to mark specific services as complete or incomplete, such as an oil change or tire rotation, which may be typically performed as part of the 10,000 mile service. The automobile owner may have the option of checking one box for a 10,000 mile service which automatically marks all services complete which are recommended for the 10,000 mile service, or the automobile owner may view the list of recommended services for the 10,000 mile service and mark the individual services complete or incomplete, even if the full 10,000 mile service was never completed (or if a 10,000 mile service was completed, but an individual recommended service was omitted). The maintenance page may sequentially include each scheduled service (e.g. 20,000 miles, 30,000 miles) and allow the automobile owner to mark the completed services.

The automobile owner may select notification settings (step 250). When it is time for the automobile owner to service the automobile, the system may notify the automobile owner. The automobile owner may indicate the manner in which to receive notifications. In various embodiments, the automobile owner may choose to receive any combination of emails, text messages, phone calls, physical mail, etc. The automobile owner may select the time frame in which to receive notifications (e.g. one week prior to expected service), as well as how many times the automobile owner should be notified. The automobile owner may customize the number and frequency of notifications. For example, the automobile owner may choose to receive a single notification letting them know that a service is due, or the automobile may choose to receive a notification once per week for an upcoming or overdue service until the automobile owner marks the service as completed.

Once the automobile owner has entered the personal information, vehicle information, maintenance history, and notification settings, the automobile owner may complete the registration process. The information input during registration may be stored in a storage mechanism, such as the car manufacturer database, the car service database, and the car mileage database.

Figure 5:
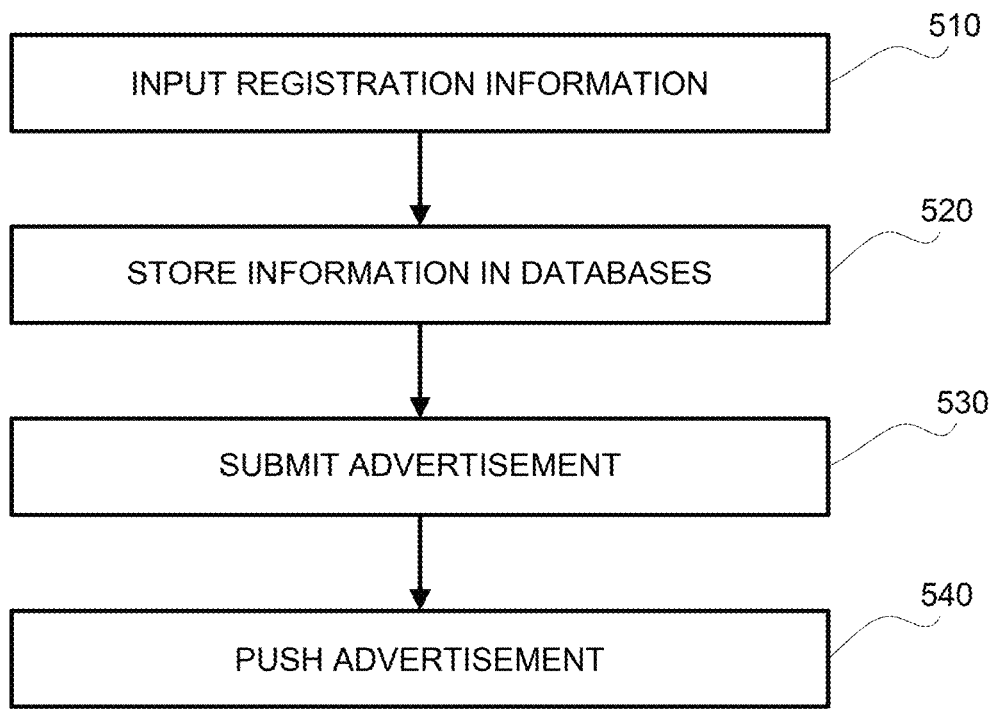
FIG. 5 illustrates a process for registering a service provider according to various embodiments.

Referring to FIG. 5, a flowchart of a process 500 for registering a service provider is illustrated according to various embodiments. The service provider may input registration information (step 510). The registration information may comprise company name, location, prices for various parts and services, any coupons they want to offer, auction market bids, etc. The service provider may indicate whether the service provider is offering to sell an automobile part, complete a service (such as installing the automobile part), or both. The registration information may be stored in the databases, such as the service bid database and the car location database (step 520). The service provider may be able to access anonymous automobile owner information. For example, the information may comprise upcoming maintenance item volumes (e.g. the number of users in a given geographic territory that have an oil change or tire rotation recommendation arriving within a given timeframe), automobile demographic information (e.g. the number of users which own an automobile that was built before a given year), user location and service history (where have spark plug changes been the most frequent), etc. In various embodiments, the service provider may submit an advertisement to the maintenance application (step 530). The service provider may submit parameters for the advertisement. For example, the service provider may submit that an advertisement for a $20.00 oil change should be submitted to any automobile owner within 500 miles of a scheduled oil change and located within 5 miles of the service provider. The maintenance application may push the advertisement to all automobile owners meeting the criteria (step 540). Automobile owners may select a link or respond to the advertisement in order to accept the terms. Additionally, once service providers are registered with the maintenance application, the service providers may be presented to automobile owners who are scheduling recommended maintenance.

Figure 6:
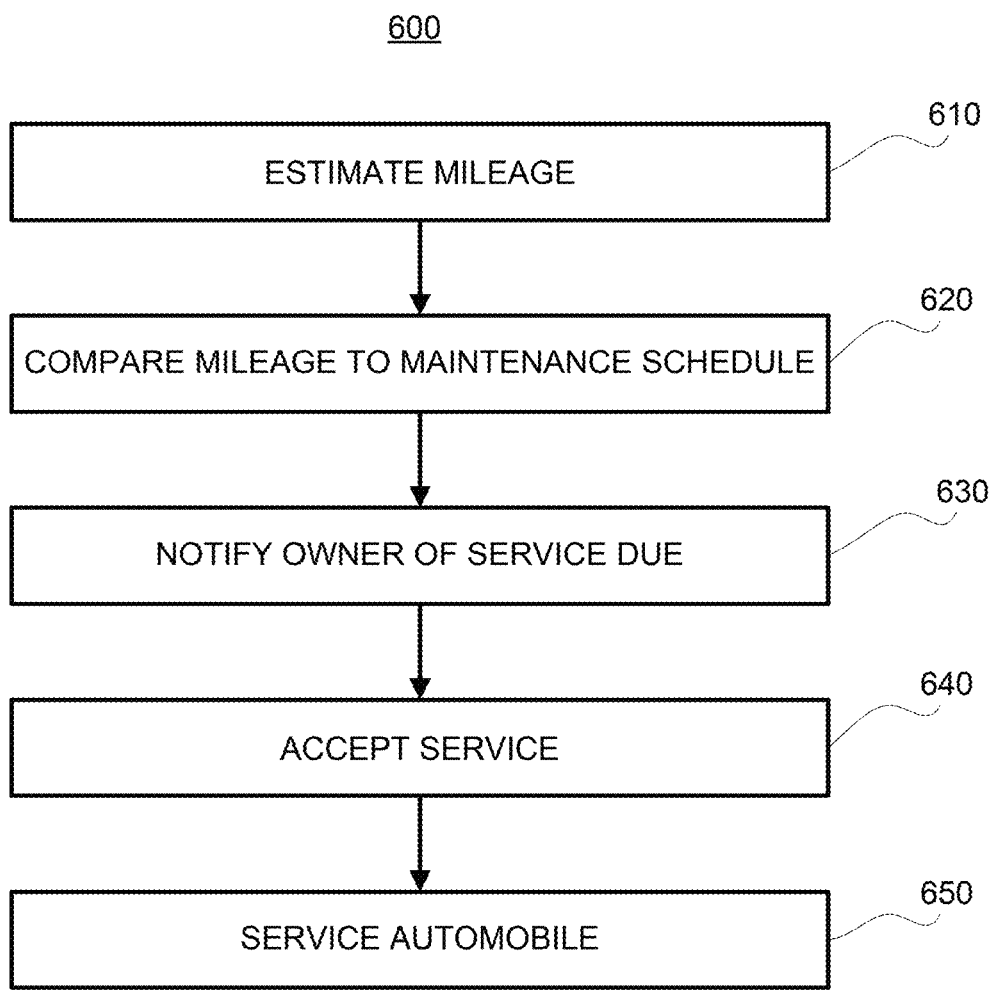
FIG. 6 illustrates a process for notifying an automobile owner of upcoming scheduled maintenance according to various embodiments.

Referring to FIG. 6, a flowchart of a process for notifying an automobile owner of upcoming scheduled maintenance is illustrated according to various embodiments. The system may estimate the current mileage of a vehicle (step 610). In various embodiments, the automobile owner may enter the vehicle mileage when initially registering the vehicle. The system may estimate current mileage at a later date via a variety of methods. In various embodiments, the automobile owner may estimate how many miles the automobile owner drives in a given period (e.g. miles/month), and the system may estimate current mileage based on how long it has been since the automobile owner registered the vehicle. In various embodiments, the system may periodically prompt the automobile owner to enter current mileage, and the system may determine the automobile owner's average number of miles driven over a given time period. In various embodiments, a tracking device, such as a GPS unit may be installed in the vehicle, and the system may determine how many miles the vehicle is driven based on distances measured by the tracking device. In various embodiments, the system may estimate the mileage based on any combination of the described methods.

The system may compare the estimated current mileage of the vehicle to the manufacturer's recommended maintenance schedule to determine whether the vehicle is due for maintenance (step 620). In various embodiments, the system may compare the mileage on a periodic basis, such as once per week.

Figure 7A:
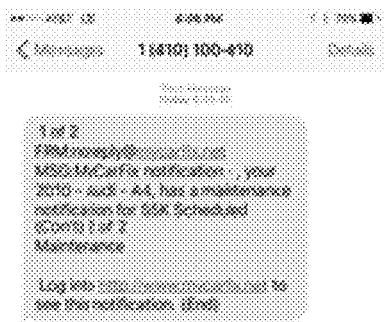
FIG. 7A illustrates text message notification according to various embodiments.
Figure 7A:
Figure 7B:
FIG. 7B illustrates an email notification according to various embodiments.

In response to the estimated current mileage being greater than, or within a predetermined number of miles within a mileage of a recommended service, the system may notify the automobile owner that the automobile is due for maintenance (step 630). The system may transmit a notification to the automobile owner via a variety of channels, such as text, email, phone, mail, etc. FIG. 7A illustrates an example screen shot of a text message notification. FIG. 7B illustrates an example screen shot of an email notification. The user may have the option to delay action, i.e. snooze the notification for a specific amount of time, such as 3 days, 3 weeks, or any other suitable period of time. The user may have the option to accept the maintenance recommendation by clicking on a link or replying to the notification (step 640).

Figure 8:
FIG. 8 illustrates an example screenshot of a list of service providers according to various embodiments.

In response to accepting the maintenance recommendation, the system may provide the automobile owner with a list of service providers, which may be stored in the aforementioned databases. The list may be sortable based on price, availability, rating, and/or distance to the automobile owner's location (home or current). In various embodiments, the service providers may comprise the make of the car in the name of the service provider, and the system may select service providers based on the name of the service provider. In various embodiments, a service provider may not comprise the make of the car in the name of the service provider, but the system may recognize the service provider as a general service provider which may service multiple makes of automobiles. The system may display servicer name, contact information, location, phone number, available coupons, and/or service pricing. FIG. 8 illustrates an example screenshot of service providers. The automobile owner may select a link to schedule the service at a specific time with the service provider, and the automobile owner may take the automobile to the service provider for the service (step 650). The service provider may access the service record for the automobile and ask the automobile owner if they would like to complete any additional recommended services which have not yet been marked as completed. In response to the service being completed, the automobile owner or the service provider may indicate that the service was completed, and the system may update the service records in the databases. In various embodiments, if the automobile owner or service provider has not marked the service complete after the scheduled time, the system may transmit a notification to the automobile owner inquiring whether the service was completed, and allowing the automobile owner to update the service record. The system may store the updated service record, and notify the automobile owner when the next service is due.

In various embodiments, the service providers may be presented to the automobile owner based on an auction. In a live auction, the maintenance application may transmit a notification to service providers that a particular service is desired in a geographic location. The service providers may compete in a reverse auction, with the ultimate lowest price being presented to the automobile owner desiring the service. The service provider may indicate whether the service provider is offering to sell an automobile part, complete a service (such as installing the automobile part), or both. In a proxy auction, each service provider may submit a bid for a particular service at any time. Thus, the service providers may pre-load their bids to the maintenance application, and when an automobile owner requests a bid, the maintenance application may search the pre-loaded bids. The various service providers may not be able to view each other's bids. The service provider may set a bid increment by which the service provider's bid automatically reduces in response to a competitor's lower bid. For example, the service provider may provide a bid of $100 for a service, with a minimum bid of $80, and a bid increment of $2. If a competitor submits a bid of $90, the system may automatically reduce the service provider's bid by $2 less than the competitor's bid. Thus the system may reduce the service provider's bid to $88. In various embodiments, the bid may be reduced to a percentage of the competitor's bid. The service provider may set an expiration date for the bid, after which the bid is no longer valid. In response to an automobile owner desiring a service, the maintenance application may select the service provider in the geographic area of the automobile owner who has submitted the lowest bid, and the maintenance application may suggest the service provider with the lowest bid to the automobile owner.

Figure 9:
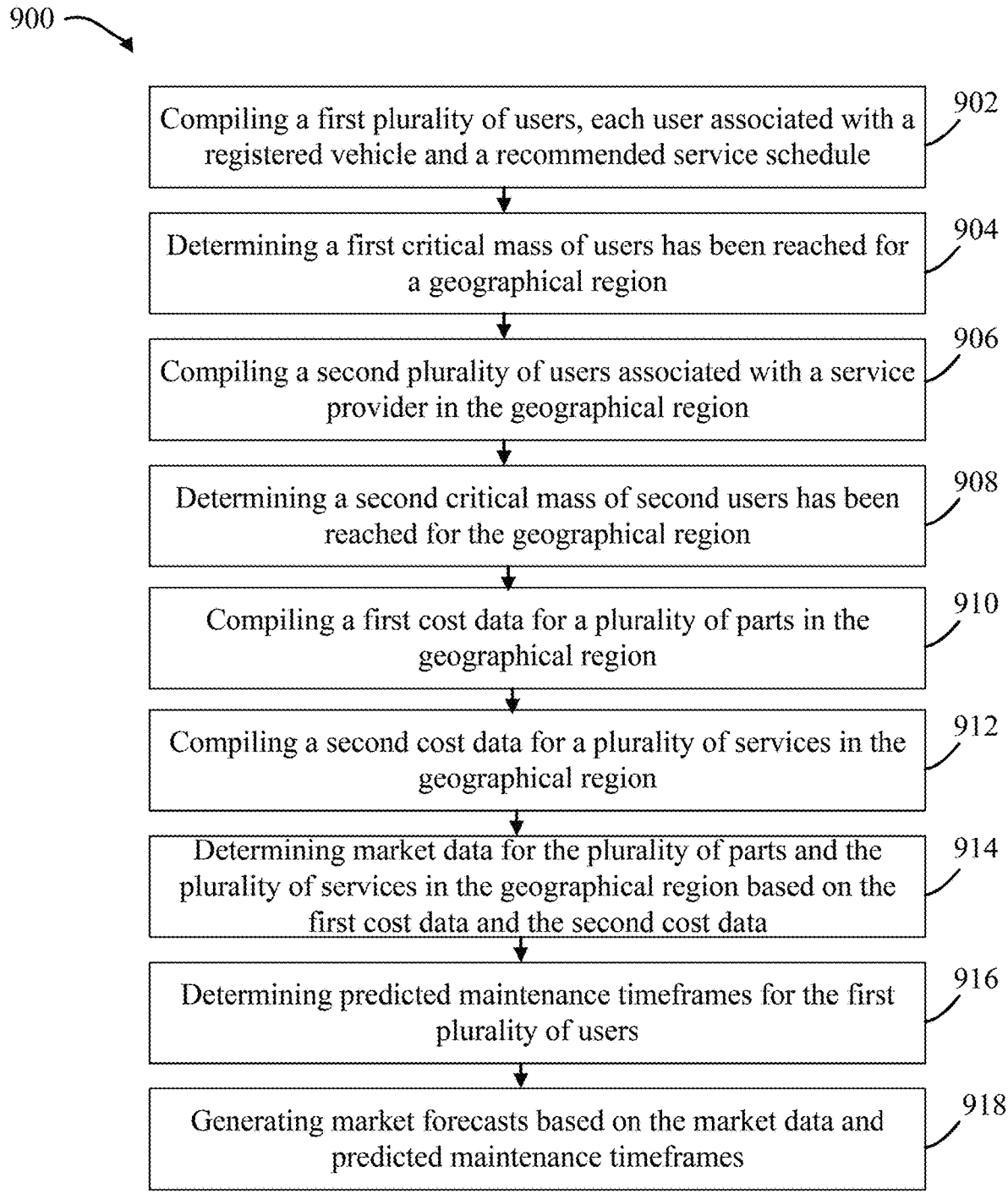
FIG. 9 illustrates a process for generating a market forecast for automobile servicing according to various embodiments.

Referring now to FIG. 9, a method 900 for generating market forecasts for automobile servicing and part replacement is illustrated, in accordance with various embodiments. The method 900 comprises compiling a first plurality of users, each user associated with a registered vehicle, a recommended service schedule, and one of a home location or a driving region (step 902). Compiling the first plurality of users may be in accordance with method 200 from FIG. 1. In this regard, each user in the plurality of users may include associated personal information (from step 210), vehicle information (from step 220), a recommended service schedule based on the vehicle information (from step 230), and the home location or the driving region based on the notification settings selected (from step 250) as described previously herein.

The method 900 further comprises determining a first critical mass of users has been reached for a geographical region (step 904). In this regard, any number of users may be defined as a critical mass of users. Additionally a critical mass in one region may be different from a critical mass in another region. The present disclosure is not limited in this regard. In an example embodiment, a critical mass for a number of first users from step 904 of method 900 may be approximately 1,000,000, or 30% or more of drivers in a geographical region (e.g., Phoenix metropolitan area) using the system 100 from FIG. 1. In this regard, each user is associated with a registered vehicle and a car manufacturer's recommended maintenance schedule. Thus, future services and future replacement part demand may be estimated via step 916 of method 900, as described further herein.

The method 900 further comprises compiling a second plurality of users associated with a service provider in the geographical region (step 906). In various embodiments, the second plurality of users may be compiled at least in part from method 500 in FIG. 5.

The method 900 further comprises determining a second critical mass of second users has been reached for the geographical region (step 908). In this regard, a predetermined percentage of service providers may be associated with a critical mass for step 908. For example, the second critical mass may be reached in response to a percentage of service providers registered compared to a total number of service providers in a region may be between 85% and 100%, or between 90% and 100% or between 95% and 100%. In various embodiments, the critical mass of step 908 may be determined based on volume of service provided as opposed to number of service providers. For example, some service providers may have a significantly greater market share and thus perform significantly more services than other service providers. In this regard, critical mass may be determined based on a percentage of registered services performed in a given year versus a total number of services performed in a given year. The various critical mass variables described herein are meant as exemplary embodiments; thus, the present disclosure is not limited in this regard.

The method 900 further comprises compiling a first cost data for a plurality of parts in the geographical region (step 910). The first cost data may be associated with a market cost to a consumer utilizing the system 100 from FIG. 1 and a replacement part through method 600 from FIG. 6. In this regard, the system may store, for any given time, a market cost for each replacement part offered at a service provider. For example, replacement parts may include, but are not limited to, tires, brake pads, spark plugs, etc.

The method 900 further comprises compiling a second cost data for a plurality of services in the geographical region (step 912). The second cost data may be associated with a market cost to a consumer utilizing the system 100 from FIG. 1 and a service through method 600 from FIG. 6. In this regard, the system may store, for any given time, a market cost for each service offered at a service provider. For example, services provided may include, but are not limited to, rotating tires, oil changes, etc.

The method 900 further comprises determining market data for the plurality of parts and the plurality of services in the geographical region based on the first cost data and the second cost data (step 914). The market data may be continuously monitored and sent to the second plurality of users (e.g., the service providers). In various embodiments, the second plurality of users may access the market data through system 100 from FIG. 1. In this regard, any service provider may analyze current market data for the plurality of parts and the plurality of services compiled in steps 910, 912, or analyze trends based on past market data, to make decisions for future part orders or the like.

The method 900 further comprises determining predicted maintenance timeframes for the first plurality of users (step 916). The predicted maintenance timeframes may be based at least in part on method 600. For example, system 100 may continuously calculate an estimated time until maintenance is due and associate specific services and parts with the maintenance due based on the recommended service schedule for each respective automobile. In this regard, in response to compiling the first plurality of users in step 902, predicted maintenance timeframes for each user in the plurality of users may be determined for a specific geographical region.

In this regard, the method 900 further comprises generating market forecasts based on the market data and the predicted maintenance timeframes (step 918). For example, the market data from step 914 may be utilized to predict a supply and/or the predicted maintenance timeframes of step 916 may be utilized to predict a demand. In this regard, service providers in the second plurality of users may stock inventory with replacement parts based on a future demand provided by step 918, or may adjust a price of services or parts based on future or current demand, or the like.

Figure 10:
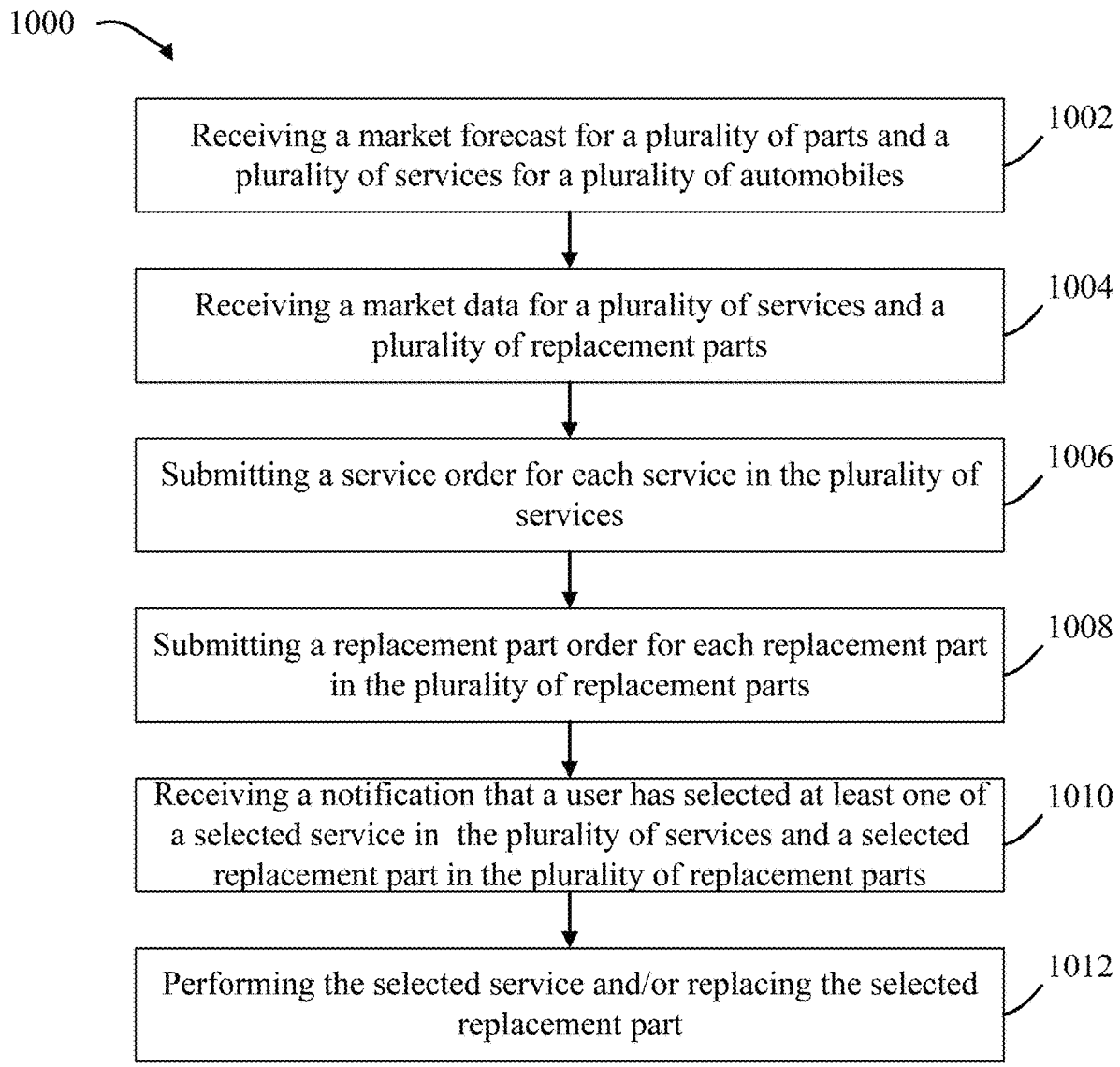
FIG. 10 illustrates a process for performing an automobile service according to various embodiments.

Referring now to FIG. 10, a method of servicing an automobile, method 1000, is illustrated, in accordance with various embodiments. The method 1000 comprises receiving a market forecast for a plurality of parts and a plurality of services for a plurality of automobiles (step 1002). The market forecast may be generated from system 100 and method 900 as described previously herein. In this regard, a service provider may review a market outlook based on the critical mass of drivers obtained from step 904 and their estimated maintenance schedule based on the drivers recommended service schedule. In this regard, various service providers may adjust staffing based on a predicted increase in demand, adjust an inventory based on future demand, and/or adjust a bid price based on future demand as described further herein.

The method 1000 further comprises receiving a market data for a plurality of services and a plurality of replacement parts (step 1004). The market data may be generated from system 100 and method 900 as described previously herein. In this regard, market data may correlate with a market price for each service in the plurality of services and each replacement part in the plurality of replacement parts. For example, the system 100 may compile each accepted service and each accepted replacement process in real time and present the market data in graphical from to the second plurality of users (e.g., the service providers) to facilitate greater market transparency for service providers, in accordance with various embodiments. In this regard, service providers may review the market forecast from step 1002 and the market data from step 1004 and determine service bids and replacement part bids to submit as described further herein.

The method 1000 further comprises submitting a service order for each service in the plurality of services (step 1006). In various embodiments, the service order includes a service price and a limit bid for each service in the plurality of services. In various embodiments, the service price may be above or below a market price determined from the market data.

For example, a service provider may notice a market price for a service is ticking up in price based on the market data from step 1004. In an attempt to benefit from the increase in pricing by competitors, the service provider may want to offer their services above the current market price for the service. Thus, in an example embodiment, the service provider may submit a service price and a limit bid that are above a market price. Alternatively, a service provider may be having a slow month and be willing to sell below a market price in order to facilitate acceptance of an offer more quickly. Thus, the service provider may submit a service order having a service price and a limit bid that are below a market price, in accordance with various embodiments.

The method 1000 further comprises submitting a replacement part order for each replacement part in the plurality of replacement parts (step 1008). In various embodiments, the replacement part order includes a replacement part price and a limit bid for each replacement part in the plurality of replacement parts. In various embodiments, the replacement part price may be above or below a market price determined from the market data. In various embodiments, as service providers are able to submit a service order for each service in the plurality of services and a replacement part order for each replacement part in the plurality of replacement parts prior to a driver having a service due, a list of offers may be provided to the driver as soon as the service is estimated to be due in accordance with method 600 from FIG. 6 as described previously herein. In various embodiments, all service providers pre-submit any replacement part orders and/or any service orders from steps 1006, 1008. In various embodiments, the system 100 from FIG. 1 may allow for both pre-submitted orders and real-time orders when services become due.

In an example embodiment, a user (e.g., a driver) drives a specific car, which is registered with the system 100 from FIG. 1 in accordance with step 902 of method 900. The specific car is associated with a recommended maintenance schedule as described previously herein, which recommends the (1) oil be changed, (2) tires be rotated, (3) brake pads be replaced, and (4) spark plugs be replaced at 75,000 miles.

Thus four services, two of which utilize replacement parts, are due at 75,000 miles for the specific car. In response to the user exceeding 75,000 miles, the system 100 may calculate a lowest potential cost for each service provider that submitted service orders and replacement orders in accordance with steps 1006, 1008 of method 1000. With brief reference back to FIG. 2, the user may select notification settings in step 250 that further include displaying service and part offers based on predetermined parameters (e.g., lowest cost, highest customer rating, greatest value (e.g., measured as a difference from face value for the service provider), closest in proximity to the user's location or pre-submitted location, etc.).

Additionally, the user may select any number of offers to receive. Thus, the driver may select sorting by lowest cost and select to receive 7 offers determined from lowest cost. Based on data received from steps 1006, 1008 and a service provider location compared to the drivers location (e.g., within a predetermined distance), the system 100 from FIG. 1 may provide a list of 7 service providers, a cost per service/part, and a total cost, the list being ordered from lowest cost to highest cost. The list may further include service provider customer ratings, a distance from the user, etc.

In an example embodiment, the list may include the following service provider data and outcomes:

TABLE 1

Exemplary Service and Part Orders

| Service Provider | Oil Change Initial Offer Price | Oil Change Limit Price | Tire Rotation Initial Offer Price | Tire Rotation Limit Price | Brake Replacement Initial Offer Price | Brake Replacement Limit Price | Spark Plug Initial Offer Price | Spark Plug Limit Price |
|---|---|---|---|---|---|---|---|---|
| 1 | $75.00 | $68.00 | $35.00 | $35.00 | $300.00 | $282.00 | $300.00 | $300.00 |
| 2 | $70.00 | $64.00 | $45.00 | $45.00 | $350.00 | $350.00 | $330.00 | $315.00 |
| 3 | $85.00 | $65.00 | $25.00 | $25.00 | $400.00 | $400.00 | $250.00 | $225.00 |
| 4 | $95.00 | $95.00 | $15.00 | $15.00 | $285.00 | $200.00 | $400.00 | $365.00 |
| 5 | $75.00 | $75.00 | $15.00 | $15.00 | $250.00 | $250.00 | $325.00 | $325.00 |
| 6 | $90.00 | $90.00 | $35.00 | $35.00 | $300.00 | $300.00 | $300.00 | $300.00 |
| 7 | $82.50 | $82.50 | $20.00 | $20.00 | $375.00 | $375.00 | $415.00 | $415.00 |

In various embodiments, all service providers may have submitted their orders prior to the user's car being due for service. In various embodiments, service providers 5-7 may have submitted their offers after the service became due and service providers 1-4 may have submitted their offers prior to the service being due in accordance with steps 1006, 1008 of method 1000. The present disclosure is not limited in this regard.

From here, the system 100 runs a pricing algorithm based on the predetermined parameter selected by the user for service providers. The results are calculated, and each vendor is listed in accordance with the predetermined parameter selected by the user in step 250 of method 200. For example, "the best price" for each item might be displayed, which might involve multiple vendors (e.g. $64 for an oil change by service provider 2; $15 to rotate the tires by service provider 4 or 5; $200 to replace the brake pads by service provider 4; $225 to change the spark plugs by #3). Alternatively, "the best value by vendor overall" may be displayed based on which vendor reduced their price the most (e.g., $45 by service provider 3). Alternatively, the predetermined parameter may be "value by vendor by item", which may be based on a difference in price of an individual item from a face value price (e.g. service provider 1 $68 to change the oil (down from $75); $35 to rotate the tires ($0 reduction); $282 to replace the brake pads (down from $300); and $300 to change the spark plugs ($0 reduction)). Alternatively, the predetermined parameter may be "vendor by rating" based on highest rating by consumers (e.g. service provider 6, while one of the most expensive options may show up first in the list of vendors based on vendor rating).

Thus, the user may select a service provider based on the list provided from system 100 described previously herein. The service provider may be selected for a specific service or for all of the services/parts. The present disclosure is not limited in this regard. In response to selecting a service, the user may be prompted to schedule a time to have the service performed. In this regard, an availability of the service provider to perform the service may be displayed to the user as described previously herein.

Referring back to method 1000, upon the user scheduling a service as described herein, the method 100 further comprises receiving a notification that a user has selected at least one of a selected service in the plurality of services and a selected replacement part in the plurality of replacement parts (step 1010). For example, the user described above may have selected all services for service provider number 1 and schedule a time to have the specific vehicle serviced with service provider 1. Thus, the user may take his automobile to the selected service provider (e.g., service provider 1), and have the car serviced in accordance with the selected service and/or the selected replacement part(s) (step 1012). Thus, in the example outlined above, the user's car may receive an oil change service, a tire rotation service, a replacement brake pad (e.g., installation of a replacement brake pad) and a replacement spark plug (e.g., installation of a replacement spark plug). In various embodiments, system 100 may include a payment method, or the user may pay directly at the service provider's location. The present disclosure is not limited in this regard.

Figure 11:
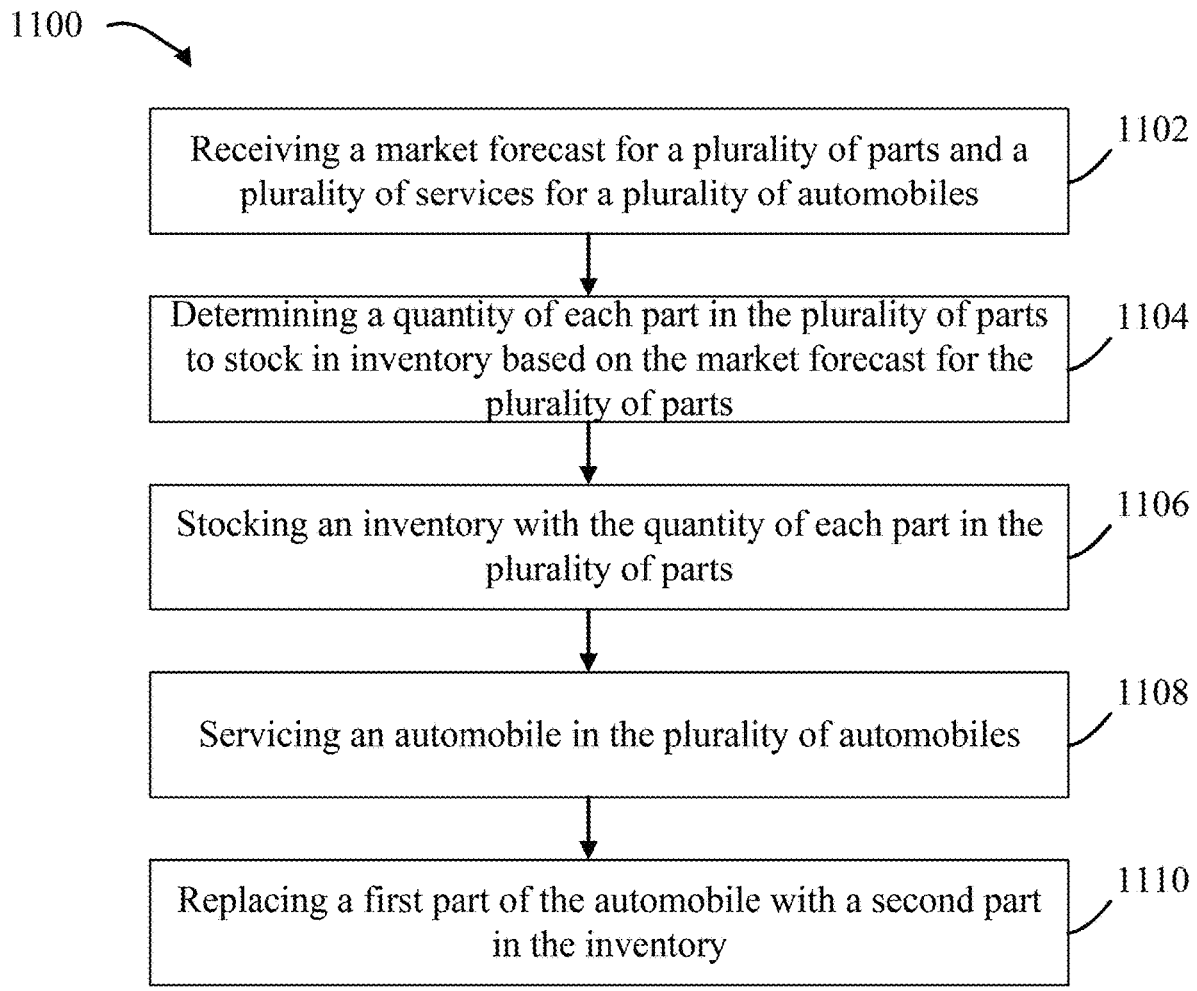
FIG. 11 illustrates a process for managing replacement parts inventory for automobile servicing according to various embodiments.

Referring now to FIG. 11, a method 1100 of inventory management for a service provider is illustrated, in accordance with various embodiments. The method 1100 comprises receiving a market forecast for a plurality of parts and a plurality of services for a geographic region (step 1102). The market forecast may be generated from step 918 of method 900 by system 100 from FIG. 1. The method 1100 further comprises determining a quantity of each part in the plurality of parts to stock in inventory based on the market forecast for the plurality of parts (step 1104). In this regard, based on a known future demand, a service provider may stock inventory accordingly with the future demand. For example, buying in bulk may be less expensive; thus, in response to knowing a future demand, the service provider may purchase a bulk order of replacement parts at a lower per unit price, thus facilitating a reduction in an order price as described previously herein. Additionally, the service provider may review the market data to determine whether ordering additional inventory based on a bulk price would be competitive with a current market price, in accordance with various embodiments.

The method 1100 further comprises stocking the inventory with the quantity of each part in the plurality of parts from step 1104 (step 1106). In this regard, the service provider may more efficiently stock their inventory based on future market demands, in accordance with various embodiments. The method 1100 further comprises servicing an automobile in the plurality of automobiles (step 1108) and replacing a first part of the automobile with a second part in the inventory (step 1110). Thus, in response to a user selecting the service provider at a future date in accordance with method 1000 from FIG. 10, the user may arrive at the service provider and have a first part removed (e.g., a spark plug or a brake pad from the example outlined above) and a second part (e.g., a replacement spark plug or a replacement brake pad) installed, the second part being stocked in inventory from step 1106 outlined above.

The systems and methods disclosed herein may allow automobile owners to easily find service providers at competitive prices when the automobile requires service. Additionally, service providers may be able to selectively target automobile owners who are in need of the service provider's services.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

A network may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®, cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or be capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, Facebook, Twitter, MMS and/or other type of communication technology. In various embodiments, a channel may be hosted or provided by a data partner. In various embodiments, the distribution channel and/or the may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Moreover, examples of mobile device communications include texting, email, and mobile applications for smartphones.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

As those skilled in the art will appreciate, a device may include but is not limited to an operating system (e.g., Windows NT, 95/98/2000/CE/Mobile, OS2, UNIX, Linux, Solaris, MacOS, PalmOS, etc.) as well as various conventional support software and drivers typically associated with computers. A device may include but is not limited to any suitable personal computer, network computer, workstation, personal digital assistant, cellular phone, smart phone, minicomputer, mainframe or the like. A device can be in a home or business environment with access to a network. In various embodiments, access is through a network or the Internet through a commercially available web-browser software package. A device may implement security protocols such as Secure Sockets Layer (SSL) and Transport Layer Security (TLS). A device may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the device may be further equipped with an Internet browser connected to the Internet or an intranet using standard dial-up, cable, DSL or any other Internet protocol known in the art. Transactions originating at a device may pass through a firewall in order to prevent unauthorized access from users of other networks. Further, additional firewalls may be deployed between the varying components of the system to further enhance security.

A firewall may include any hardware and/or software suitably configured to protect ACS components and/or enterprise computing resources from users of other networks. Further, a firewall may be configured to limit or restrict access to various systems and components behind the firewall for devices connecting through a web server. A firewall may reside in varying configurations including Stateful Inspection, Proxy based, access control lists, and Packet Filtering among others. A firewall may be integrated within a web server or any other ACS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. Web Sphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
compiling, by a computer-based system, data associated with a plurality of users in a database, each user in the plurality of users associated with an automobile, an initial mileage, a mileage per unit time estimation, and a location, the plurality of users including a first user;
retrieving, by the computer-based system, a recommended maintenance schedule associated with the automobile for each user in the plurality of users;
determining, by the computer-based system, an estimated service date for each user in the plurality of users based on the recommended maintenance schedule;
receiving, by the computer-based system and from a tracking device disposed in the automobile, distances measured by the tracking device;
transmitting, by the computer-based system to a first mobile device associated with the first user and responsive to a determination that a current mileage is greater than or within a predetermined number of miles, a first notification including at least one of a text or an email, the first notification including a link to a graphical user interface (GUI);
receiving, via the first mobile device, a selection of the link and, responsive to the selection of the link, displaying the graphical user interface (GUI) on a display of the first mobile device;
receiving, by the computer-based system from the first mobile device and through the graphical user interface (GUI), a selection of a service order interface element, wherein the service order interface element is for a plurality of maintenance services for the automobile of the first user in the plurality of users, a service order associated with the service order interface element including a service price and a service limit bid for each service in the plurality of maintenance services;
receiving, by the computer-based system from the first mobile device and through the graphical user interface (GUI), a selection of a replacement part order interface element, wherein the replacement part order interface element is for a plurality of replacement parts for the automobile, a replacement part order associated with the replacement part order interface element including a replacement part price and a replacement part limit bid for each replacement part in the plurality of replacement parts;
transmitting, by the computer-based system, a notification that the first user in the plurality of users has selected at least one of a selected service from the plurality of maintenance services and scheduled the selected service, the first user selecting the selected service based on receiving a list of service providers including a service offer for the selected service based on the service order submitted for the selected service;
determining, by the computer-based system, a critical mass of users has been reached for a geographical region based on a number of compiled users in the geographical region exceeding a threshold;
calculating, by the computer-based system, an estimated number of services to be performed for the plurality of maintenance services based on the automobile, the recommended maintenance schedule, the initial mileage, and the mileage per unit time estimation for each user in the plurality of users having the location be within the geographical region;
generating, by the computer-based system, a market forecast based on the estimated number of services;
transmitting, by the computer-based system, the market forecast to a display device in response to the market forecast being generated; and in response to the first user arriving at a scheduled time for the selected service, the automobile of the first user is serviced with the selected service.

2. The method of claim 1, wherein servicing the automobile of the first user includes removing a first part from the automobile of the first user and installing a second part in the automobile of the first user, the second part being one of the plurality of replacement parts.

3. The method of claim 1, wherein the notification is received, the receiving the notification comprising the first user selecting a set of services in the plurality of maintenance services.

4. The method of claim 1, further comprising receiving, by the computer-based system and through the display device, the market forecast for the plurality of maintenance services and the plurality of replacement parts.

5. The method of claim 4, further comprising receiving, by the computer-based system and through the display device, a market data for the plurality of maintenance services and the plurality of replacement parts.

6. The method of claim 5, wherein the service order and the replacement part order are based on one of the market forecast and the market data.

7. The method of claim 6, wherein the market forecast is based on data from the plurality of users.

8. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
compiling, by the processor, data associated with a plurality of users, each user in the plurality of users associated with an automobile, an initial mileage, a mileage per unit time estimation, and a location, the plurality of users including a first user;
retrieving, by the processor, a recommended maintenance schedule associated with the automobile for each user in the plurality of users;
determining, by the processor, an estimated service date for each user in the plurality of users based on the recommended maintenance schedule;
receiving, by the processor, and from a tracking device disposed in the automobile, distances measured by the tracking device for each user in the plurality of users;
transmitting, by the processor, to a first mobile device associated with the first user and responsive to a determination that a current mileage is greater than or within a predetermined number of miles, a first notification including at least one of a text or an email, the first notification including a link to a graphical user interface (GUI);
receiving, via the first mobile device, a selection of the link and, responsive to the selection of the link, displaying the graphical user interface (GUI) on a display of the first mobile device;
receiving, by the processor from the first mobile device and through the graphical user interface (GUI), a selection of a service order interface element, wherein the service order interface element for a plurality of maintenance services for the automobile, a service order associated with the service order interface element including a service price and a service limit bid for each service in the plurality of maintenance services;
receiving, by the processor from the first mobile device and through the graphical user interface (GUI), a selection of a replacement part order interface element, wherein the replacement part order interface element is for a plurality of replacement parts for the automobile, a replacement part order associated with the replacement part order interface element including a replacement part price and a replacement part limit bid for each replacement part in the plurality of replacement parts;
transmitting, by the processor, a notification that the first user has selected at least one of a selected service from the plurality of maintenance services and scheduled the selected service for a scheduled date and time, the first user selecting the selected service based on receiving a list of service providers including a service offer for the selected service based on the service order submitted for the selected service;
wherein the operations further comprise:
determining, by the processor, a critical mass of users has been reached for a geographical region based on a number of compiled users in the geographical region exceeding a threshold;
calculating an estimated number of services to be performed for the plurality of maintenance services based on the automobile, the recommended maintenance schedule, the initial mileage, and the mileage per unit time estimation for each user in the plurality of users with the location within the geographical region;
generating a market forecast based on the estimated number of services; and
transmitting the market forecast to a display device in response to the market forecast being generated.

9. The computer-based system of claim 8, further comprising the display device, wherein the display device is disposed at a service provider located in the geographical region.

10. The computer-based system of claim 9, wherein the operations further comprise receiving, through a second graphical user interface (GUI) on the display device, the service order for each service in the plurality of maintenance services.

11. The computer-based system of claim 8, wherein the operations further comprises:
compiling a first cost data for the plurality of replacement parts in the geographical region; and
compiling a second cost data for the plurality of services in the geographical region.

12. The computer-based system of claim 11, wherein the first cost data and the second cost data are compiled in response to services in the plurality of services being scheduled by the plurality of users through the computer-based system.

13. The computer-based system of claim 12, wherein the operations further comprise determining market data for the plurality of replacement parts based on the first cost data.

14. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
compiling, by the processor, data associated with a plurality of users, each user in the plurality of users associated with an automobile, an initial mileage, a mileage per unit time estimation, and a location, the plurality of users including a first user;

retrieving, by the processor, a recommended maintenance schedule associated with the automobile for each user in the plurality of users;

determining, by the processor, an estimated service date for each user in the plurality of users based on the recommended maintenance schedule;

receiving, by the processor and from a tracking device disposed in the automobile, distances measured by the tracking device for each user in the plurality of users;

transmitting, by the processor to a first mobile device associated with the first user and responsive to a determination that a current mileage is greater than or within a predetermined number of miles, a first notification including at least one of a text or an email, the first notification including a link to a graphical user interface (GUI);

receiving, via the first mobile device, a selection of the link and, responsive to the selection of the link, displaying the graphical user interface (GUI) on a display of the first mobile device;

receiving, by the processor from the first mobile device and through the graphical user interface (GUI), a selection of a service order interface element, wherein the service order interface element is for a plurality of maintenance services for the automobile, a service order associated with the service order interface element including a service price and a service limit bid for each service in the plurality of maintenance services;

receiving, by the processor from the first mobile device and through the graphical receiving, by the processor from the first mobile device and through the graphical user interface (GUI), a selection of a replacement part order interface element, wherein the replacement part order interface element is for a plurality of replacement parts for the automobile, a replacement part order associated with the replacement part order interface element including a replacement part price and a replacement part limit bid for each replacement part in the plurality of replacement parts;

transmitting, by the processor, a notification that the first user has selected at least one of a selected service from the plurality of maintenance services and scheduled the selected service for a scheduled date and time, the first user selecting the selected service based on receiving a list of service providers including a service offer for the selected service based on the service order submitted for the selected service;

wherein the operations further comprise:
receiving, via the processor, a demand forecast for the plurality of replacement parts for a plurality of automobiles, the demand forecast based on a plurality of estimated maintenance services, the plurality of estimated maintenance services determined from an automobile type, the recommended maintenance schedule associated with the automobile type, and the mileage per unit time input for each user in the plurality of users;

determining, via the processor, a quantity of each replacement part in the plurality of replacement parts to stock in an inventory based on the demand forecast;

generating, via the processor, a report with the quantity of each replacement part in the plurality of replacement parts to stock in the inventory;

transmitting, via the processor, the report to a service provider; and in response to the service provider receiving the report, the inventory is stocked with the quantity of each part in the plurality of replacement parts.

15. The computer-based system of claim 14, wherein the automobile being serviced in accordance with the selected service further includes servicing the automobile with a selected part in the plurality of replacement parts, the selected part being selected from the inventory.

16. The computer-based system of claim 14, wherein the data associated with the plurality of users is compiled via the processor, and wherein receiving the demand forecast for the plurality of replacement parts is through the processor.

17. The computer-based system of claim 14, wherein the plurality of users for generating the demand forecast are in a specific geographical region.

18. The computer-based system of claim 17, wherein the demand forecast is generated in response to a critical mass of the plurality of users being reached in the specific geographical region.

19. The computer-based system of claim 14, wherein the operations further comprise:

receiving, via the processor, the replacement part order for the plurality of replacement parts for the automobile in the plurality of automobiles, the replacement part order including a replacement part starting offer and the replacement part limit bid for each replacement part in the plurality of replacement parts; and transmitting, via the processor, the notification that the first user in the plurality of users has selected the selected service from the plurality of maintenance services and scheduled the selected service, the selected service including replacement of a selected replacement part in the plurality of replacement parts, the first user selecting the selected service based on receiving the list of service providers including the service offer for the selected service based on the replacement part order submitted for the selected service.

\* \* \* \* \*